Figure 1:
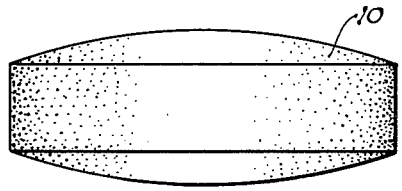
Figure 2:
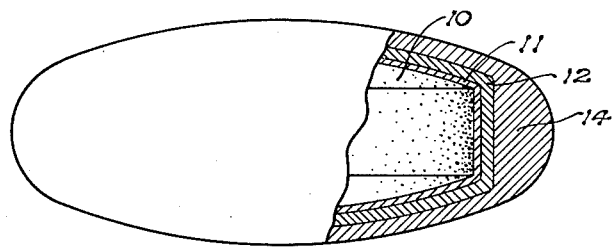
Figure 3:
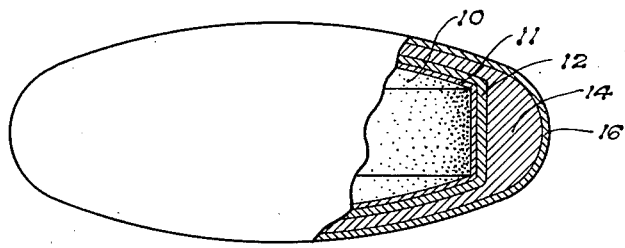

The MDR of potassium has not yet been ascertained. The amount of potassium used in the instant composition (in conjunction with potassium iodide) may range from about 1 mg. to about 5 mg. Preferably, potassium is incorporated in the composition in the form of one of its salts, such as potassium sulfate. About 3.8 mg. of potassium sulfate (C. P.) is equivalent to 1.7 mg. of potassium, which is the optimum amount of potassium for use with the optimum amount of potassium iodide hereinbefore mentioned.

The amount of molybdenum that may be used in the practice of the instant invention ranges from about 0.1 mg. to about 0.5 mg. Ordinarily molybdenum is incorporated in the form of one of its salts, preferably as sodium molybdate. About 0.505 mg. of sodium molybdate ($Na_2MoO_4.2H_2O$) is equivalent to 0.2 mg. of molybdenum, which is the optimum amount. The MDR has not yet been ascertained.

The MDR of iron is about 10 mg., but the amount of iron that may be used in the instant invention ranges from about 2 mg. to about 10 mg., since a substantial amount of iron is ordinarily supplied to the body by many different foods. The optimum amount of iron for use in the invention is about 3.3 mg. Preferably iron is incorporated in the instant composition in the form of one of its salts, as for example, ferrous sulfate. About 11.5 mg. of ferrous sulfate (dried USP) is equivalent to 3.33 mg. of iron.

The MDR of copper has not yet been ascertained. The amount of copper that may be used in the instant invention ranges from about 0.5 mg. to about 2 mg. The optimum of copper for use in the instant composition is about 1 mg. Preferably, the copper is incorporated in the form of one of its salts, as for example, copper sulfate. About 2.8 mg. of copper sulfate (monohydrate) is equivalent to 1 mg. of copper.

The MDR of zinc has not yet been ascertained. The amount of zinc that may be used in the instant invention ranges from about 0.2 mg. to about 1 mg. The optimum amount of zinc is about 0.4 mg. Zinc is preferably incorporated in the composition in the form of its salt, zinc sulfate. About 1.1 mg. of zinc sulfate (dried C. P.) is equivalent to 0.4 mg. of zinc.

The MDR of magnesium has not yet been ascertained. The amount of magnesium that may be used in the instant invention ranges from about 1 mg. to about 10 mg. The optimum amount of magnesium is about 2 mg. Preferably, magnesium is incorporated in the composition in the form of one of its salts, such as magnesium sulfate. About 14.5% mg. of magnesium sulfate (dried) is equivalent to 2 mg. of magnesium.

It will be appreciated that other essential minerals such as calcium and phosphorus may also be included (usually in amounts substantially less than their MDR because many foods contain these minerals); but in the case of children who ordinarily consume rather substantial amounts of milk and milk products rich in these minerals, it is preferable to omit these particular minerals in the instant composition.

CARRIER MEDIUM

It has been found that an admixture of the preferred quantities hereinbefore specified of each of the essential vitamins and minerals just described weighs approximately 0.232 gram and this amount is preferably incorporated in the carrier medium in such proportions that the final composition contains the daily dosage (i. e., 0.232 gram) in approximately 1.5 grams of composition. The essential vitamin and/or mineral content of the instant composition may ordinarily range from approximately a minimum of 5% to a maximum of about 25%, and the range is preferably 10 to 20%. The most preferred concentration is about 15%. The essential vitamin and mineral concentration is based upon the use of the so called vitamin and/or mineral "concentrates," which are not necessarily the pure active ingredient. In fact, in the case of such vitamins as A and D the concentrates are supplied only in an oil base, such as soya oil or corn oil. Other concentrates are also diluted to certain extent by carrier oils or filler materials in ordinary commercial practice. The proportions herein set forth for the amount of vitamin and/or mineral concentrates in the instant composition are, of course, dependent to an appreciable extent upon the particular selection of vitamins and/or minerals, but it will be understood that these proportions relate to the "concentrates" in their commercially available forms containing certain small amounts of carrier oils and/or filler materials. It will also be appreciated that only one or more vitamins may be employed or only one or more of the essential minerals may be employed in the instant compostion, although in its most preferred form the instant composition provides an overall complete diet supplement in the form of essential vitamins and essential minerals.

The remaining material in the composition consists primarily of the so called "carrier medium," although certain additives may also be present and functionally cooperate with the carrier medium and these additives will be discussed subsequently.

In its most preferred form the carrier medium comprises three essential ingredients, namely, polyethylene wax, propylene glycol and glycerine. These ingredients are admixed so as to provide a substantially homogeneous one phase admixture which has a paste-like consistency (when the other ingredients including the vitamins and minerals are intimately dispersed therein). In addition, this carrier medium provides an essentially water-soluble non-toxic medium which is also primarily non-hygroscopic so that substantial amounts of water are not absorbed thereby. The presence of water impairs appreciably the stability of certain of the vitamins particularly.

The instant invention contemplates the use, as one of the carrier medium ingredients, of a non-toxic water-soluble polyalkylene glycol. Such materials are well known commercially and sold under the trade name "Carbowax." The materials are liquids or solid wax-like materials obtained by the inter-condensation of glycols or glycol units. The alkylene unit is preferably a $C_2$—$C_3$ unit (i. e., ethylene or propylene). Such materials have preferably a sufficient number of repeating units or a sufficiently high molecular weight to be solid at ordinary conditions of room temperature; but their molecular weight is not so high as to cause them to be water insoluble. The melting point (actually a melting range) of such waxes is preferably at least about 35° C. and not more than about 65° C., and most preferably 45–55° C. The waxes are palatable, chemically inert, and substantially non-hygroscopic, so as to reduce materially the hygroscopicity of the instant composition. The most preferred compound for use in the invention is "Carbowax 4000" which is a solid polyethylene glycol having an average molecular weight of 3000 to 3700 and a solidifying range of 50–55° C. Such solid compounds having molecular weights ranging from 1500 to about 8000 may be used advantageously in the practice of the instant invention, but in some instances liquids of as little as about 300 molecular weight may be used.

Another important ingredient in the instant carrier medium is a non-toxic water-soluble dihydroxy alkane. One of the essential functions of this compound is that of assisting in the mutual miscibility of the carrier medium ingredients. This compound is an excellent solvent for the wax and is also completely miscible with the glycerine. Ordinarily, the dihydroxy alkane is required in order to obtain complete compatibility between the wax and the glycerine. The dihydroxy alkane is preferably a $C_3$—$C_5$ compound, such as propylene, butylene and amylene glycol; and most preferably the compound is propylene glycol. This compound is also relatively non-hygroscopic and it cooperates with the wax to minimize the hygroscopic tendencies of the carrier medium.

The wax and the dihydroxy alkane are preferably employed in the instant composition in weight ratios of 1:2 to 2:1, and most preferably the weight ratio therebetween is 1:1.

The remainder of the carrier medium consists essentially of glycerine. Glycerine is particularly suitable as a vehicle for imparting the desired paste-like consistency to the composition and providing internal lubrication therefor to permit suitable flowing of the material through a restricted orifice during use. The glycerine is ordinarily used in substantially greater quantities than either the wax or the dihydroxy alkane. In general, the wax: glycerine weight ratio may range from about 1:10 to about 1:3, and most preferably it is about 1:4. The weight ratios for dihydroxy alkane to glycerine are substantially the same.

Additives

An additional aspect of the instant invention is based upon the discovery that unusually superior results may be obtained in the practice of the instant invention by the use of relatively minute amounts of a non-toxic water-soluble cellulose ether binder in the instant composition. Actually, such binder forms a part of the carrier medium and very materially adds to the thermal stability or resistance to viscosity changes under different temperature conditions in the composition. The binder used in the practice of the instant invention may be an alkyl cellulose ether, such as methyl or ethyl cellulose, but it has been found to be much more preferable to use a salt of a carboxyalkyl cellulose such as sodium carboxymethyl cellulose. This material apparently has certain very unique properties, one of which includes the previously mentioned function of imparting thermal stability to the overall composition. It is also understood that this compound is relatively hygroscopic in nature. Although it is not desired to limit the instant invention to any particular theory, it is believed that by the incorporation of relatively minute amounts of this compound in the instant composition it is possible to provide a medium which is essentially non-hygroscopic, but which has incorporated therein a material which is sufficiently hygroscopic to absorb and retain all moisture which penetrates the essentially non-hygroscopic carrier medium. By this means it is possible to prevent substantially any deterioration of the moisture sensitive diet supplement ingredients which might be caused by the presence of relatively small amounts of moisture in the carrier medium. The amount of such cellulosic binder material employed in the instant invention is preferably about 2-3% of the diet supplement content (i. e., the essential vitamin and mineral concentrates); or expressed in other terms, from about 0.1 to about 1% of the overall composition, and most preferably about 0.2-0.5%. (As used herein, the terms "parts" and "%" means parts and percent by weight unless otherwise specified.)

Another important aspect of the instant invention resides in the use in the instant composition of a suitable "oil" retainer or absorbent, which also is non-toxic, water-soluble and palatable. As previously mentioned, it is standard procedure to embody certain of the vitamin concentrates particularly in oils, for the purpose of stabilizing and protecting such vitamin concentrates. These oils are quite essential to the protection of the individual vitamin concentrates in many instances. It has been found that it is not absolutely necessary to retain the vitamin concentrate in the precise concentration of oil in which the concentrate is originally provided (as in the case of enclosing such concentrates in a gelatin capsule) and instead it has been found that an appreciably advantageous effect is obtained if the oil is effectively maintained in the presence of the vitamin concentrate in the instant composition. Otherwise, the oils have a tendency to separate out of the composition to a very appreciable extent. It has, therefore, been found to be of particular advantage to include the instant oil absorbent in the composition of the invention. The oil absorbent employed may be any one of a number of non-toxic water soluble palatable ingredients within a group of ingredients including sugars, starch and proteins. In general, the sugars and starch are preferred for use in the instant invention because these ingredients have maximum heat and storage stability. The most preferred ingredient in this class is lactose which has been found to give uniquely superior results. The amount of such ingredient employed will, of course, vary to some extent depending upon the amount of oil-borne vitamins and/or minerals included in the composition and this amount may be as much as about 10% of the composition, although it is preferably in the range of about 2–6%. Expressed in terms of the diet supplement content, the amount of the oil absorbent should be about 0.1 to about one times the weight of the diet supplement, and most preferably about one-fourth of the weight of the diet supplement. It has also been found that the oil absorbent apparently has additional functions in imparting the proper consistency, stability, etc. to the instant composition, because this ingredient enhances the overall properties of the instant composition even when a minimum amount of oil-borne vitamin concentrates is employed therein.

Another additive which is employed in the instant composition is a coloring material. This material is, of course, "harmless" or non-toxic and essentially water soluble and palatable to the extent that the other ingredients in the carrier medium have these properties. The amount of coloring material used may be as much as 5%, and preferably it is about 1–3%, since it is desired to incorporate an appreciable amount of coloring in the instant composition. The coloring acts as a light filter (to reduce the harmful effect of light upon the essential ingredients) and also imparts a very distinct color, such as a chocolate color imparted by cocoa, to the composition so as to give it the appearance of chocolate candy or some comparably palatable material. The preferred coloring agent is cocoa. Also, suitable traces of a "harmless" antioxidant such as propylgallate and a "harmless" sweetening agent such as saccharin are preferably included in the composition of the invention.

The operative, preferred and most preferred proportions for certain specific ingredients are set forth in table form below:

*Ranges (weight, percent)*

| Operative | Preferred | Opt. | Ingredient |
|---|---|---|---|
| 5-25 | 10-20 | 15 | Essential vitamin and mineral concentrates. |
| 0-10 | 2-6 | 4 | Oil absorbent (Lactose). |
| Trace-5 | 1-3 | 2 | Coloring (Cocoa). |
| 0.1-1 | 0.2-0.5 | 0.4 | Cellulose Binder (Na carboxymethyl cellulose). |
| 5-20 | 10-15 | 12 | Wax (Carbowax 4000). |
| 5-20 | 10-15 | 13 | Glycol (propylene). |
| 30-70 | 45-60 | 53+ | Glycerine. |
| Trace | | | Antioxidant. |
| Trace | | | Sweetening. |

It will be appreciated that any of the foregoing ingredients may be used in the proportions indicated in the foregoing table, the already important requirement being that the particular combination of ingredients selected will involve the use of such ingredients in proportions which will necessarily result in a paste-like consistency of the type herein desired.

Another important aspect of the instant invention involves the fact that the instant carrier medium may be employed with only vitamins or only minerals, in each case the vitamin or mineral content should be approximately that herein set forth for the vitamin plus mineral content, since a sufficiently appreciable amount of vitamins and/or minerals are used in the instant composition to affect the consistency thereof to some extent.

A typical procedure for compounding the instant composition is as follows:

First, thoroughly admix a charge consisting of 6.96 grams of the essential vitamins and minerals in proportions corresponding to the preferred proportions (i. e., 30 daily dosages at 0.232 gram per dose), 2 grams of lactose and 1 gram of cocoa. Next, admix therewith a trace of propylgallate (antioxidant) and a suitable amount of sweetening (saccharin), both of the foregoing steps being carried out under a blanket of carbon dioxide gas. Next, thoroughly admix 5.5 grams of a 3% sodium carboxymethyl cellulose in glycerine solution; and finally admix the resulting charge with 30 grams of a glycerine solution containing 17½ percent "Carbowax 4000" and 20% propylene glycol, the carbowax-propylene glycol-glycerine solution having been prepared by first melting the Carbowax, then adding the propylene glycol thereto to form a solution and finally adding the necessary amount of glycerine thereto to form a solution.

It will be understood that modifications and variations may be effected without departing from the scope of the novel concepts of the present invention.

I claim as my invention:

1. An edible paste-like pharmaceutical composition comprising 5–25% essential vitamin and mineral concentrates some of which are hydrophobic materials and some of which are hygroscopic materials, 2–10% non-toxic water-soluble palatable oil absorbent sugars, 0.1–1% non-toxic water-soluble cellulose ether binder, 5–20% non-toxic water-soluble polyalkylene glycol wax, 5–20% propylene glycol, and the remainder consisting essentially of glycerine with minor traces of suitable antioxidant and sweetening materials.

2. An edible paste-like pharmaceutical composition, comprising 5–25% essential vitamin and mineral concentrates some of which are hydrophobic materials and some of which are hygroscopic materials, 0.1–1% non-toxic water-soluble cellulose ether binder, 5–20% non-toxic water-soluble polyalkylene glycol wax, 5–20% propylene glycol, and the remainder consisting essentially of glycerine with minor traces of suitable antioxidant and sweetening materials.

3. An edible paste-like pharmaceutical composition, comprising 5–25% essential vitamin concentrates, some of which are hydrophobic materials and some of which are hygroscopic materials, 0.1–1% non-toxic water-soluble cellulose ether binder, 5–20% non-toxic water-soluble polyalkylene glycol wax, 5–20% propylene glycol, and the remainder consisting essentially of glycerine with minor traces of suitable antioxidant and sweetening materials.

4. An edible paste-like pharmaceutical composition, comprising 5–25% essential mineral concentrates some of which are hydrophobic materials and some of which are hygroscopic materials, 0.1–1% non-toxic water-soluble cellulose ether binder, 5–20% non-toxic water-soluble polyalkylene glycol wax, 5–20% propylene glycol, and the remainder consisting essentially of glycerine with minor traces of suitable antioxidant and sweetening materials.

5. An edible paste-like pharmaceutical composition, comprising 15% essential vitamin and mineral concentrates some of which are hydrophobic materials and some of which are hygroscopic materials, 4% lactose, 2% cocoa, 0.4% sodium carboxymethyl cellulose, 12% polyethylene glycol having 3000–37000 molecular weight, 13% propylene glycol and the remainder consisting essentially of glycerine.

References Cited in the file of this patent

UNITED STATES PATENTS

| | | |
|---|---|---|
| 2,149,005 | Bockmuhl | Feb. 28, 1939 |
| 2,540,253 | Gakenheimer | Feb. 6, 1951 |
| 2,591,742 | Thomas | Apr. 8, 1952 |
| 2,681,297 | Moore | June 15, 1954 |

FOREIGN PATENTS

| | | |
|---|---|---|
| 493,925 | Great Britain | Dec. 31, 1936 |

OTHER REFERENCES

Howard: Modern Drug Encyclopedia, 5th ed., 1952, pp. 1082 and 1083.

Manuf. Chem., vol. 14, March 1943, page 59.

Reid: Annals of Surgery, vol. 118, October 1943, page 749.

Stawitz: Pharmaz. Ind., vol. 12, 1950, page 92.

Extra Pharmacopoeia, vol. I, 1952, page 578.

Wood: Tablet Making, 1904, page 35.